(12) United States Patent
Tucker et al.

(10) Patent No.: US 11,016,529 B1
(45) Date of Patent: May 25, 2021

(54) COMPUTING DEVICE

(71) Applicant: Lenovo (Singapore) Pte. Ltd., Singapore (SG)

(72) Inventors: Matthew Ian Tucker, Durham, NC (US); Matthew Hilliard, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/734,350

(22) Filed: Jan. 5, 2020

(51) Int. Cl.
*G06F 1/16* (2006.01)

(52) U.S. Cl.
CPC .......... *G06F 1/1616* (2013.01); *G06F 1/1679* (2013.01); *G06F 1/1681* (2013.01)

(58) Field of Classification Search
CPC . G06F 1/1616; G06F 1/1681; E05D 11/0054; H05K 5/0226
USPC ............................ 16/255, 256, 265, 282–285
See application file for complete search history.

(56) References Cited

U.S. PATENT DOCUMENTS

| | | | |
|---|---|---|---|
| 8,064,970 B2 * | 11/2011 | Gaddy | G06F 1/1681 455/575.1 |
| 9,983,637 B1 * | 5/2018 | Morrison | G06F 1/1641 |
| 10,401,914 B2 * | 9/2019 | Shang | E05D 5/04 |
| 10,571,977 B2 * | 2/2020 | Escamilla | G06F 1/1616 |
| 10,635,140 B1 * | 4/2020 | McKittrick | G06F 1/1618 |
| 10,725,505 B1 * | 7/2020 | Hallar | G06F 1/1637 |
| 10,736,224 B2 * | 8/2020 | Park | G06F 1/16 |
| 10,775,852 B2 * | 9/2020 | Kim | H04M 1/0216 |
| 2005/0050686 A1 * | 3/2005 | Kurokawa | G06F 1/1681 16/354 |
| 2017/0356227 A1 * | 12/2017 | Maatta | E05D 11/1007 |
| 2018/0059735 A1 * | 3/2018 | Tazbaz | G06F 1/1677 |
| 2020/0133351 A1 * | 4/2020 | Gault | H04M 1/022 |
| 2020/0267856 A1 * | 8/2020 | Hsu | E05D 3/18 |

* cited by examiner

*Primary Examiner* — Anthony Q Edwards
(74) *Attorney, Agent, or Firm* — Brian J. Pangrle

(57) ABSTRACT

A device can include a first housing that includes a first display and a first recess; a second housing that includes a second display and a second recess; and a retractable hinge assembly where, in a planar orientation of the first housing and the second housing, the retractable hinge assembly is retracted in part in the first recess and in part in the second recess.

23 Claims, 12 Drawing Sheets

US 11,016,529 B1

COMPUTING DEVICE

TECHNICAL FIELD

Subject matter disclosed herein generally relates to computing and display devices.

BACKGROUND

A device can include housings coupled via one or more hinge assemblies where one or more of the housings can include a display.

SUMMARY

A device can include a first housing that includes a first display and a first recess; a second housing that includes a second display and a second recess; and a retractable hinge assembly where, in a planar orientation of the first housing and the second housing, the retractable hinge assembly is retracted in part in the first recess and in part in the second recess. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
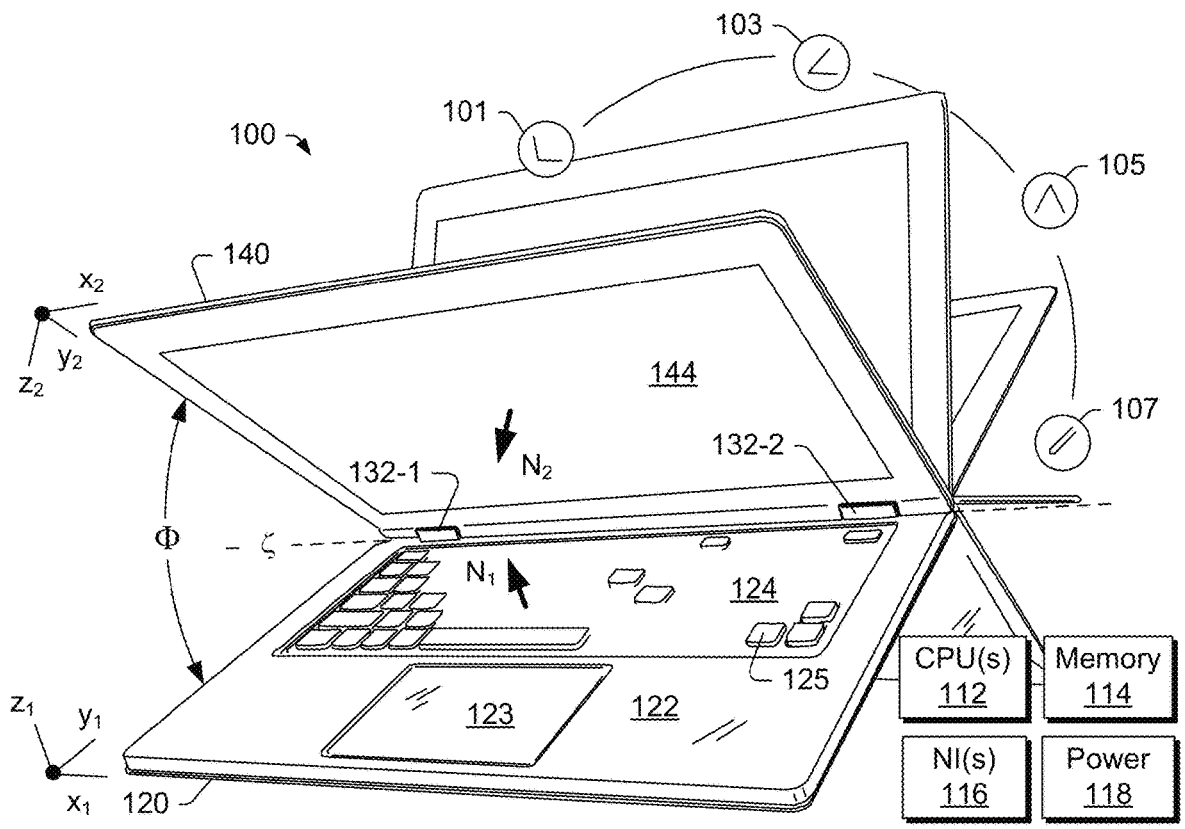
FIG. 1 is a series of diagrams of examples of devices.
Figure 1:
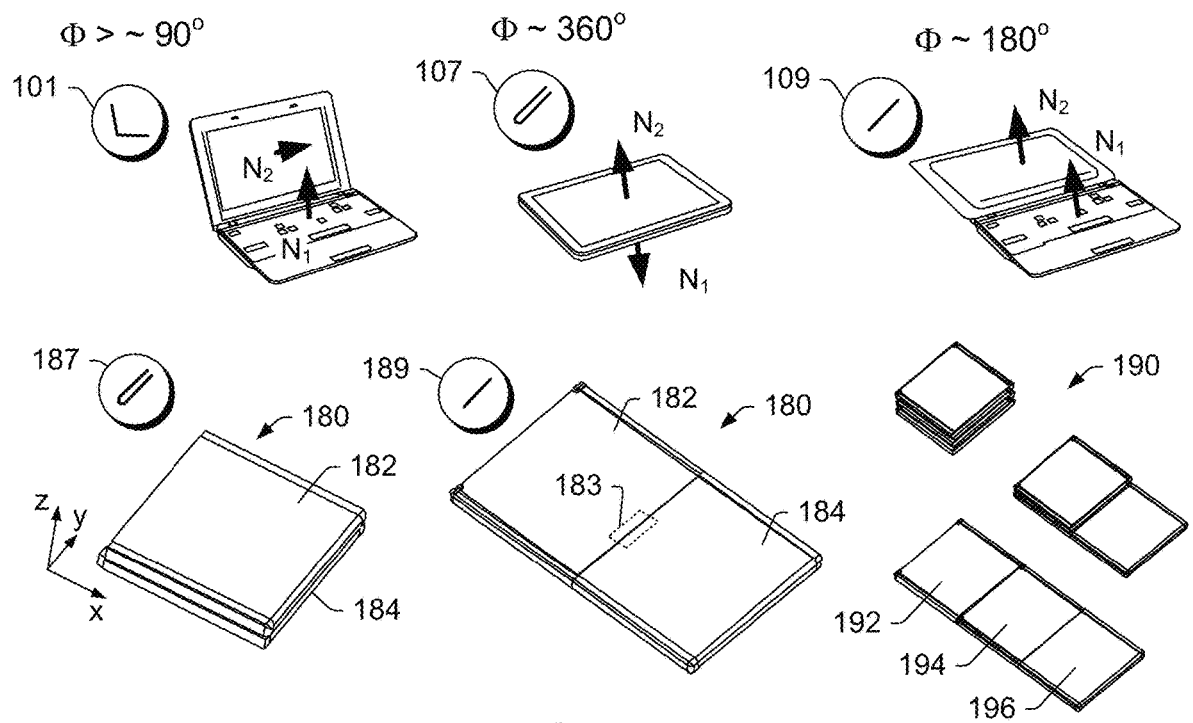

FIG. 1 shows an example of a system 100 that includes a keyboard housing 120 and a display housing 140 that are pivotable with respect to each other via movement about one or more hinges 132-1 and 132-2 (e.g., hinge assemblies). FIG. 1 also shows an example of a system 180 that includes a first housing 182 and a second housing 184 that are pivotable with respect to each other via movement about one or more hinges 183 and an example of a system 190 that includes a first housing 192, a second housing 194 and a third housing 196 that may be pivotable with respect to each other via movement about hinges.

As an example, the system 100, the system 180 and/or the system 190 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, the housing 182, the housing 184, the housing 182 and the housing 184, one or more of the housings 192, 194 and 196, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

As shown in FIG. 1, the system 180 can include a folded orientation 187 and a planar orientation 189. As an example, one or both of the housings 182 and 184 may include a display. For example, the housing 182 can be a first housing with a first display and the housing 184 can be a second housing with a second display.

As shown in FIG. 1, the system 190 can include various orientations, including, for example, a planar orientation of the three housings, a partially folded orientation and a folded orientation. As an example, a three housing system may be configurable in more than one folded orientation with respect to a "middle" housing. For example, the housings 192 and 196 may be folded with respect to the housing 194 with the housing 192 on the top side or bottom side or with the housing 196 on the top side or bottom side.

As explained with respect to FIG. 1, a computing device can include two or more displays. For example, a dual-screen computer can include a first touch-sensitive display and a second touch-sensitive display where each of the displays may be mounted to a respective housing where the housings are operatively coupled via one or more hinge assemblies.

As explained, a multi-display computing device can be oriented in a flat or planar orientation. For example, a dual-display computer can include 360 degree hinges which allow the device to fold flat (e.g., a flat mode) and to fold back into tablet mode. In the flat mode, or planar orientation (see, e.g., the device 180 of FIG. 1), it can be desirable to bring the two displays as close together as possible. Such an approach can be aesthetic and ergonomic as it can look clean and be less distracting that an approach that has a large gap between two displays. Where displays are as closely positioned, the displays can facilitate multitasking, dragging files from one screen to the other screen using touch (e.g., gestures) or interactions that involve touch input spanning both displays. For example, where a relatively continuous display is formed, a user's finger or fingers may readily glide from one display to the other; whereas, with a gap, it may present an uneven surface that can interrupt a user's flow.

In an approach that closely positions displays, a dead zone may be minimized or practically eliminated, which, as mentioned, can facilitate smooth swiping or other between display gestures, etc. As an example, consider dragging a file from a folder shown on a C surface display to a folder shown on a B surface display using a finger on the surface of the screens. If there is a long distance and time between when the finger leaves the C surface screen and when it enters the B surface screen, the experience may feel forced, which may deter a user from taking advantage of various functionality. Additionally, some users may desire display of a large image or window that spans multiple displays, as if the displays constituted one large display. If the gap between the displays is not sufficiently small, this use-case becomes unappealing. Where a gap can be kept quite small, a user may find real value in spanning an image across both displays.

As mentioned, a computing device can include housings coupled by one or more hinge assemblies where the hinge assemblies provide for 360 degree rotation (see, e.g., FIG. 1). However, such hinge assemblies can result in a relatively large gap when the computing device is in a planar orientation. In various examples, a 360 degree hinge assembly can be retractable such that it is in a retracted orientation when a computing device is in a planar orientation. As the hinge assembly can be retracted, housings can be positioned more closely, which can minimize the size of a gap. Such an approach may allow for a relatively continuous surface such that single image display across multiple displays, touches across multiple displays, etc., are suitably acceptable such that a user can take advantage of an enlarged display area from a device that can fold to a smaller footprint (e.g., a closed clamshell orientation, a tablet orientation, etc.). In various examples, a retractable hinge assembly can provide for 360 degree rotation such that a dual display device can be oriented in a closed orientation, a planar orientation or a tablet orientation where the planar orientation provides for a relatively continuous dual display surface.

As mentioned, a laptop (e.g., notebook) computing device can be described with respect to components such as housing components that may be referred to as A/B and C/D, which can be, for example, display and keyboard housings or, for example, dual display housings. On the A/B side, the hinges tend to be mounted below the display panel, and on the C/D side, the hinges tend to be mounted above the keyboard or, for example, in a dual-screen laptop, mounted above the display. While such mounting of hinges may allow for 360 rotation, it creates a large gap between the displays because, at 180 degrees, the hinge mechanism is located in a space that is between the two displays that spaces apart the two displays (e.g., a space that accommodates the hinge mechanism).

As mentioned, a hinge assembly can be retracting, which can allow for movement of various hinge assembly components into a body of a computing device, which can thereby allow for closer arrangement of displays where the computing device is a multi-display device.

As an example, a device can include a retractable hinge assembly (e.g., or retractable hinge assemblies) that can automatically pull two housings of the device together when the housings are rotated such that a gap between displays is kept to a minimum. In such an example, a user may manually position the device without having to perform any additional operations as the retractable hinge assembly can operate automatically. For example, a rotation angle passes 180 degrees where the hinge assembly is in a retracted state, the hinge assembly can begin to extend out from a housing or housings a device, while keeping any screen gap as small as possible and while allowing clearance for closing the device into tablet mode.

As an example, a retractable hinge assembly can convert rotation at a hinge assembly into linear motion that can retract the retractable hinge assembly. As an example, a retractable hinge assembly can utilize one or more cams, which can include surface shapes such as, for example, helical faces that can contact each other to convert rotation into linear motion.

As an example, a cam assembly can be separate from an axle assembly. For example, a cam assembly can provide for dedicated functionality as to converting rotational movement to translation movement. In such an example, a shaft about which helical faces rotate can be separate from a shaft in a hinge assembly that transmits torque. Such an approach can provide for space utilization and separation of functions that can adequately handle torque, etc., which can increase longevity, improve user experience, etc. As an example, a shaft that transmits torque may be made larger, for example, filling a full available diameter. A separate shaft which aligns cam surfaces (e.g., helical-faced components, etc.) may be smaller and have lesser demands as to torque or demands only as to alignment. As mentioned, such an approach can make a device more robust and reliable.

As an example, one or more cam surfaces may be shaped to provide for desired behavior of a retractable hinge assembly. As an example, a cam surface can be shaped to distribute pressure, which may help to reduce risk of damage. As an example, where a device includes two housings coupled by retractable hinge assemblies that retract into each of the respect housings, cam surface area may be increased by including two or more sets of cam assemblies in each retractable hinge assembly. For example, consider a right side cam assembly and a left side cam assembly, which may be inboard axle assemblies that include, for example, gears. In such an approach, the axle assemblies can handle orientation of housings and the cam assemblies can handle retraction of the hinge assemblies into the housings responsive to rotation of the housings.

As an example, a device can include a retractable hinge assembly with four helical faces in contact with each other, which spreads pressure out over a larger area. In such an example, pairs of faces can be 180 degrees from each other about a common axis, such that the net of the forces exerted on these faces does not try to shift the pieces out of alignment with their common axis.

As an example, a cam assembly can provide for automatically reversing linear motion direction half way through a rotation travel. For example, as a user opens a laptop from 0 to 360 degrees, the hinge retracts during the period from 0 degrees to 180 degrees and then extends during the period from 180 degrees to 360 degrees.

As an example, a retractable hinge assembly may be defined by parts, which can include Part A as one of a plurality of helical-faced components, which can be a linkage between two hinge axes as may be utilized in a 360 degree hinge. As Part A rotates, its helical face can mesh with helical face on Part B. When rotated 90 degrees, it has forced part B to travel in the X direction relative to the laptop. Part C can be a basic lever which converts the X direction motion into Y direction motion. In such an example, this Y direction motion can be the motion to pull an entire sliding hinge mechanism inside a laptop housing. For example, the hinge mechanism can retract inside the body of a laptop. In such an approach, force provided by the helical faces serves to retract the hinge into the device, and the opposite force demand to extend the hinge out of the device may be supplied via one or more spring components (e.g., an extension spring, etc.).

Figure 2:
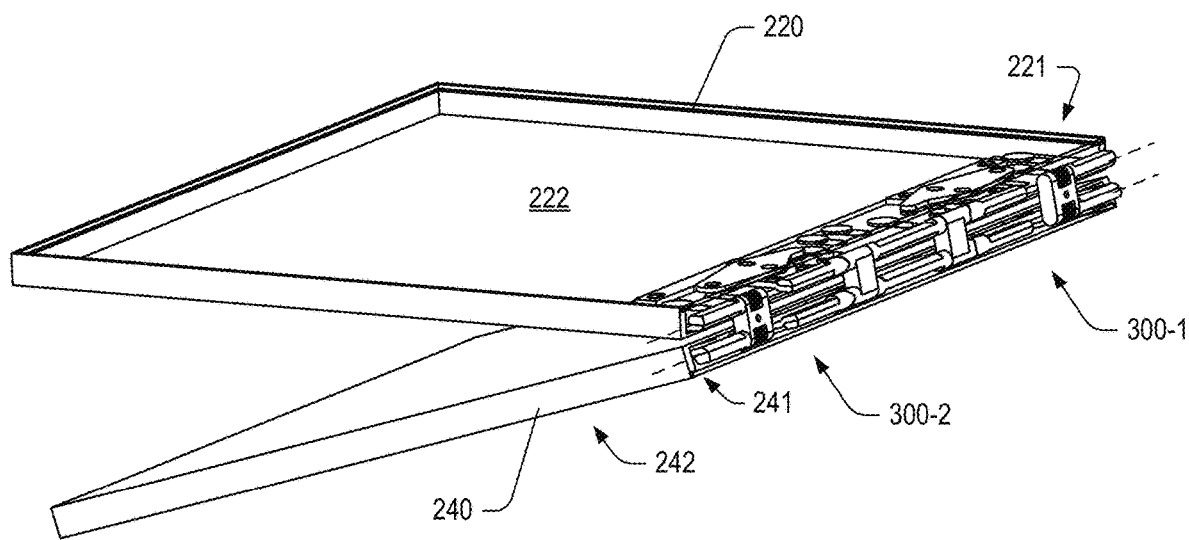
FIG. 2 is a perspective view of an example of a device that includes at least one retractable hinge assembly.

FIG. 2 shows a perspective view of an example of a device 200 with two housing 220 and 240 without housing covers to one side such that retractable hinge assemblies 300-1 and 300-2 can be viewed. Further, the device 200 may include one or more retractable hinge assembly covers, which are not shown in FIG. 2 to provide for viewing the retractable hinge assemblies 300-1 and 300-2.

In the example of FIG. 2, the housing 220 can include a recess 221 and a display with a display surface 222 and the housing 240 can include a recess 241 and display with a display surface 242. As shown, the display surfaces 222 and 242 are at an angle about a hinge axis that is greater than 270 degrees and less than 360 degrees. Such an orientation may be realized upon transitioning to a tablet orientation (e.g., 360 degrees) or transitioning from a tablet orientation to another orientation. In the example of FIG. 2, the retractable hinge assemblies 300-1 and 300-2 show hinge axes (e.g., two hinge axes) that are extended outwardly from the housings 220 and 240. As explained, in a 180 degree orientation (e.g., planar orientation of the housings 220 and 240), the hinge axes can be retracted into respective recesses of the housings 220 and 240. In the example of FIG. 2, the retractable hinge assemblies 300-1 and 300-2 can be referred to as dual axis, noting that one axis or the other may be utilized to define an orientation. In a dual axis arrangement, the two axes can define a plane where, for example, a reference axis may be mid-way between the two axes.

In the example of FIG. 2, the retractable hinge assemblies 300-1 and 300-2 can be configured to retract when the housings 220 and 240 are aligned in a plane, which can be referred to as a 180 degree orientation. The device 200 can also have two folded orientations which can be referred to as a 0 degree orientation and a 360 degree orientation. In such an example, the retractable hinge assemblies 300-1 and 300-2 can retract into the housings 220 and 240 when transitioning from the 180 degree orientation to the 0 degree orientation and from the 180 degree orientation to the 360 degree orientation. In such an example, the displacement of a single or a pair of retractable hinge assemblies of the retractable hinge assemblies 300-1 and 300-2 can differ depending on whether rotation is from the 180 degree orientation to the 0 degree orientation or from the 180 degree orientation to the 360 degree orientation. As an example, a plot can be utilized to characterize angle formed by the two housings 220 and 240 and displacement or displacements. One or more retractable hinge assemblies can be utilized with desirable behavior that can include some amount of linearity and/or nonlinearity in a relationship or relationships between angle and displacement and/or symmetry and/or asymmetry in behavior (e.g., with respect to transitions to or out of a planar, 180 degree orientation).

In the example of FIG. 2, the device 200 can include the housing 220 as a first housing that includes a first display and a first recess; the housing 240 as a second housing that includes a second display and a second recess; and one or more of the retractable hinge assemblies 300-1 and 300-2 where, in a planar orientation of the first housing 220 and the second housing 240, the one or more retractable hinge assemblies 300-1 and 300-2 are retracted in part in the first recess of the first housing 220 and in part in the second recess of the second housing 240.

Figure 3:
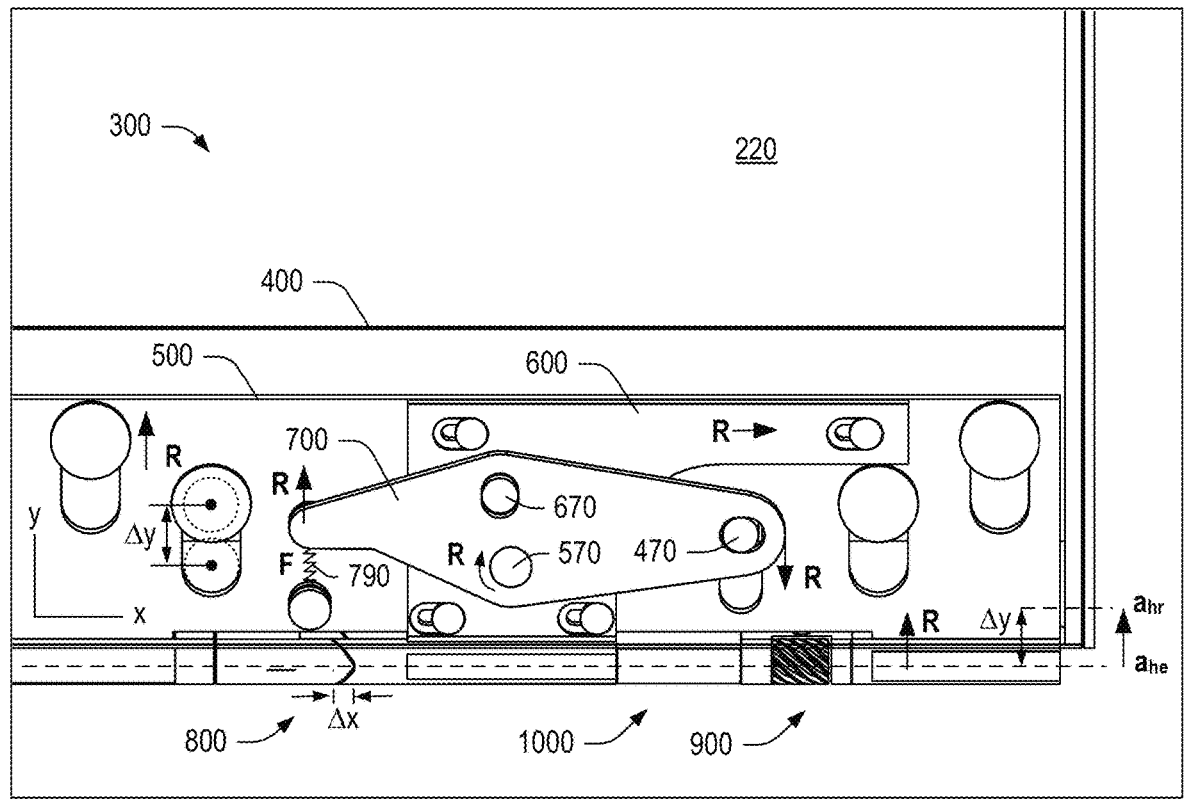
FIG. 3 is a plan view of an example of a retractable hinge assembly.

FIG. 3 shows an example of a retractable hinge assembly 300, which includes hinge components and retracting components that are operatively coupled. With respect to FIG. 2, the retractable hinge assembly 300 can correspond to the upper retractable hinge assembly of the retractable hinge assembly 300-1 (e.g., the upper leaf of the dual-leaf retractable hinge assembly 300-1). FIG. 2 shows four instances of the retractable hinge assembly 300 (e.g., four leaves), which can be flipped, mirrored, etc. As an example, a retractable hinge assembly can be a multi-leaf retractable hinge assembly (e.g., with two or more leaves). For example, as explained with respect to FIG. 2, the retractable hinge assemblies 300-1 and 300-2 include two leaf portions, one received by the housing 220 and one received by the housing 240. While FIG. 3 shows various features of a single leaf, the retractable hinge assembly 300 can be a dual-leaf retractable hinge assembly (e.g., or optionally a dual-leaf assembly where only one leaf assembly is retractable, etc.). As an example, the retractable hinge assemblies 300-1 and 300-2 may be a single retractable hinge assembly with a leaf that seats in the housing 220 and a leaf that seats in the housing 240 (see, e.g., the axle support plate 500, which may be configured to accommodate multiple assemblies, etc.).

In the example of FIG. 3, a hinge axis is shown as being in an extended state $a_{he}$ and in a retracted state $a_{hr}$, where a throw distance can be defined by a dimension such as Δy. Such a dimension may be defined, for example, by one or more features such as, for example, a guide (e.g., a peg in a guide opening, etc.). As shown, the position of the hinge axis in the retracted state is sufficient to bring the hinge axis within the housing 220 (e.g., within a recess of the housing 220). In FIG. 3, various arrows labeled "R" indicate directions of movement when transitioning from the extended state to the retracted state.

In the example of FIG. 3, the retractable hinge assembly 300 (RHA 300) includes a base 400 that is fixed to the housing 220, an axle support plate 500 that is movably coupled to the base 400, a cam support plate 600 that is movably coupled to the axle support plate 500, a coupling 700 that pivots to couple motion of the axle support plate 500 and the cam support plate 600, a cam assembly 800 that is in part coupled to the cam support plate and an axle assembly 900 that is coupled to the axle support plate 500. In the example of FIG. 3, the axle assembly 900 is configured to operatively coupled the retractable hinge assembly 300 to another axle assembly such that a dual axle assembly can be utilized to operatively couple two housings such as the housing 220 and the housing 240.

The example of FIG. 3 also shows a friction assembly 1000, which can be provided such that an orientation of the housing 220 and the housing 240 is maintained and can be suitably adjusted manually. For example, where a user manually adjusts the housings 220 and 240 to have an angle greater than 90 degrees and less than 180 degrees, the orientation may be maintained at that angle under the acceleration of gravity (e.g., such that gravity does not cause the angle to creep undesirably toward a low energy potential state). A friction assembly can include metallic components, polymeric components, etc. For example, consider an assembly of washers on an axle that includes threaded ends where the washers can be tightened to achieve a desired level of friction. In such an example, washer to washer friction may be sufficient to hold housings in a desired orientation. In such an example, the assembly may be adjustable, for example, to retighten if loosening occurs. As an example, bushing may be utilized, which may include a polymeric material that can snuggly fit about a rotatable axle, etc., where friction exists between the bushing and the rotatable axle.

In the example of FIG. 3, the coupling 700 is shown as being biased via a spring component 790, which can provide a force between the axle support plate 500 and the coupling 700.

In the example of FIG. 3, an x and y coordinate system is shown that may be utilized to describe various motions, movements, etc. As shown, the axle support plate 500 moves in a direction substantially along the y-axis, which can be a retraction axis or retraction direction. In FIG. 3, the axle support plate 500 is extended to a maximum extent in a negative direction with respect to the y-axis, which can be, for example, an orientation that corresponds to a 0 degree orientation or a 360 degree orientation of two housings (e.g., the housings 220 and 240). In a 180 degree orientation, the axle support plate 500 translates in a direction of the y-axis inwardly such that the components carried by the axle support plate 500 move inwardly, for example, into a recess of the housing 220.

As to the cam support plate 600, in the example of FIG. 3, it can move laterally substantially in a direction of the x-axis. The cam support plate 600 can be driven via rotation at the cam assembly 800 that causes cam action where cam surfaces ride upon each other to cause lateral movement of the cam support plate 600. For example, where the RHA 300 is in a 0 degree orientation, upon rotating the housing 220 and the housing 240 to a 180 degree orientation, the cam assembly 800 will force the cam support plate 600 to move toward the right in a positive direction of the x-axis. The coupling 700, being operatively coupled to the cam support plate 600 and the axle support plate 500, causes the cam driven action to cause the axle support plate 500 to retract. In the example of FIG. 3, R is utilized to represent directions of motion upon retraction of the retractable hinge assembly 300 (e.g., transitioning of the hinge axis from a position $a_{he}$ to a position $a_{hr}$).

As shown in the example of FIG. 3, the coupling 700 operates with respect to a peg 470 of the base 400, a peg 570 of the axle support plate, and a peg 670 of the cam support plate 600. As the cam assembly 800 causes the cam support plate 600 to move, the spring component 790 stretches, as it tries to keep the RHA 300 in the extended orientation shown in FIG. 3. For example, the spring component 790 can be characterized by Hooke's law where, as the axle support plate 500 retracts a distance Δy, the force applied by the spring component 790 can increase (e.g., $F=-k\Delta y$, where k is a selected spring constant).

In the example of FIG. 3, the cam assembly 800 can experience force as cam surfaces convert rotation to translation, which, as mentioned, can be resisted by action of the spring component 790. As an example, the RHA 300 can be duplicated to reduce force at each of a plurality of cam assemblies. Further, the diameter of a cam assembly can be limited where it is to recess into a relatively thin housing. As an example, a cam assembly can be tailored with a support shaft (e.g., an alignment shaft) that can align opposing cam components with respective cam surfaces that contact where the support shaft helps to maintain alignment of the cam surfaces as they rotate with respect to each other, for example, to generate force along the x-direction, which, as explained, can cause the RHA 300 to retract. Where other forces are born by other components such as, for example, the axle assembly 900, various components of the cam assembly 800 can be optimized and, for example, made and arranged to be space saving. As an example, a support shaft as an alignment mechanism can allow for making cam components of smaller diameter as they can be hollow cylindrical types of structures with a supporting central shaft; alternatively, a hollow cylinder may be utilized where cam components are disposed within for purposes of alignment; however, as mentioned, outer diameter can be larger, which may result in a larger recess of a housing. As to a support shaft as an alignment mechanism for cam surfaces of a cam assembly, as an example, it may be configured to be relatively free of torque and it may optionally be freely rotating.

In the example of FIG. 3, the cam assembly 800 is provided for making the RHA 300 retract where, for example, the spring component 790 can aim to help maintain the RHA 300 in an extended orientation with respect to the housing 220.

As an example, a RHA can operate via a cam assembly whereby rotation at the cam assembly causes translation by a distance along an axial direction (e.g., x-axis) where the distance is transferred into another distance that can be greater and in a different direction (e.g., y-axis). As an example, a first distance can be of the order of X millimeters and a second distance can be of the order of Y millimeters where Y is greater than X and where Y can be at least 1.1 times greater than X, can be at least 1.5 times greater than X, can be at least 2 times greater than X, etc. As an example, consider approximately 3 mm at a cam assembly (e.g., a Δx dimension) being converted to 6 mm at a hinge axis (see, e.g., Δy).

As an example, a cam assembly 800 can include surfaces that can provide for a locating effect such that housings of a device can be located at a particular orientation. For example, consider a dome on one surface and a flat or detent on another surface such that the surfaces provide for locating.

As to the axle assembly 900, it can include a helical gear that couples to an idler gear that can couple to another helical gear or, for example, it may include another type of mechanism. The axle assembly 900 can be sized such that it can fit within a recess of the housing 220 when the RHA 300 is retracted. As an example, two housings can be coupled such that motion is synchronous such that both housings move with respect to an axle assembly of one RHA of a first housing and an axle assembly of a mating RHA of a second housing. In various examples, an axle assembly can include a component that provides for aligning two gears, optionally in combination with an idler gear. Such a component may be a bridge that spans a distance in a direction of the y-axis when two housings are in a planar, 180 degree orientation. In such an example, the component can be disposed in part in a recess of one of the housing and disposed in part in a recess of the other one of the housings. In such an example, the component bridges the housings where the housings may be in direct contact with each other. Where each of two housings has an "infinity" edge for a display thereof, where housings contact in a planar, 180 degree orientation, the displays may appear to be one continuous display. Where a housing or housings include a bezel (e.g., as a frame, etc.), the housings may contact in a planar, 180 degree orientation where displays thereof are spaced by a bezel distance or bezel distances.

As to the number of guides of a RHA, some may be staggered in a direction of the y-axis, which can provide for anti-rocking with respect to a housing. Such an approach can help to maintain one or more components in desired orientations. For example, guides can help to maintain the axle support plate 500 in planar alignment with the base 400 and/or a surface of the housing 220. As an example, guides can help to maintain the cam support plate 600 in planar alignment with the base 400, a surface of the housing 220, the axle support plate 500, etc.

In the example of FIG. 3, guides can cooperate with guide posts or guide pegs, which may be separate components or integral components. For example, the base 400 can include threaded bores for receipt of screw-in guide posts, which may include heads that act to provide plate support. In such an example, a plate may be "sandwiched" between another component (e.g., a plate, a base, etc.) and a portion of a head of a guide post. Such an approach can help to limit motion along the axis of the guide post. In such an example, some amount of clearance can be provided to help facilitate movement of a plate with respect to a base, another plate, a coupling, etc.

As an example, various components can be made of material and/or finished (e.g., polished, coated, etc.) in a manner to reduce sliding friction. For example, consider one or more polymeric types of coatings, nitriding, etc., that can provide for lesser friction, lesser wear, etc. As an example, a cam surface may be made of a particular material, treated, finished coated, etc., to improve cam performance and/or cam longevity. As an example, a cam may be made of a metal, an alloy, a polymeric material, a ceramic material, a composite material with properties sufficient to endure repeated episodes of transitions in orientations of a display device via one or more RHAs.

Figure 4:
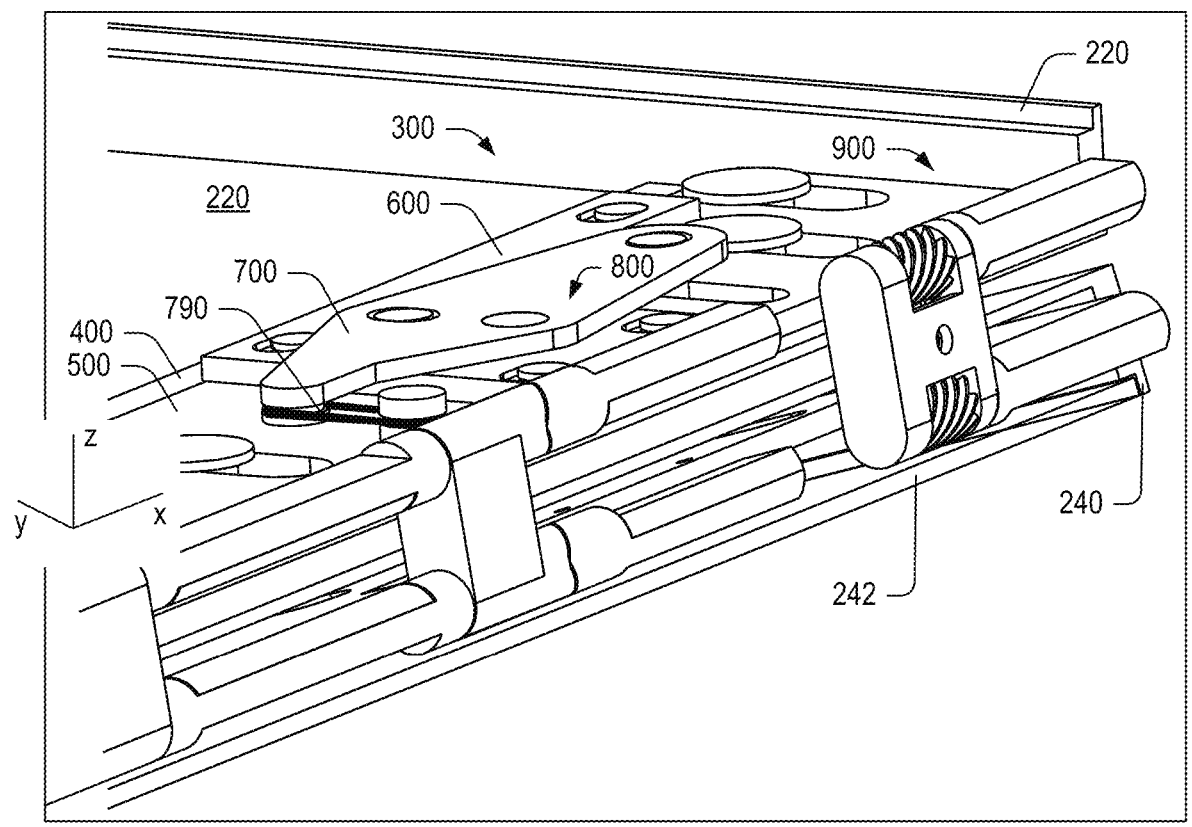
FIG. 4 is a perspective view of an example of a retractable hinge assembly.

FIG. 4 shows a perspective view of the RHA 300 of FIG. 3 with the housing 220 along with a mating RHA of the housing 240. As shown, the housing 240 includes a display surface 242 (e.g., display glass, etc.); whereas, the housing 220 shows a notch that can be utilized to support a display surface. In the example of FIG. 4, the display surface 222 is not present to better illustrate various features of the RHA 300.

As shown, FIG. 4 includes a Cartesian coordinate system with x, y and z axes that can be utilized to describe one or more components, relationships between components, motions, etc. As shown, the spring component 790 may be a band, which can be made of an elastomer, a metal, an alloy, etc.

As to location of a spring component, such a component may be located at one or more locations. For example, in FIG. 3 and FIG. 4, the spring component 790 is located to be efficient with respect to the direction of travel of retraction. For example, the spring component 790 can include an axis, axes, force component(s), etc., that are substantially aligned along a direction of the y-axis. In the example of FIG. 3 and FIG. 4, as the coupling 700 rotates clockwise, the spring component 790 may be in an extended state at an angle to the y-axis and apply a force that pulls the coupling 700 in a direction such that it become aligned with the y-axis.

As shown, the spring component 790 can be located proximate to the cam assembly 800, which is a driver for retraction and stretching of the spring component 790 (e.g., lengthening of the spring component 790). As an example, additionally or alternatively, one or more spring components may be located to bias the cam support plate 600 as to motion in the direction of the x-axis. As an example, additionally or alternatively, one or more torsion springs may be utilized as one or more spring components. For example, consider a torsion spring at the peg 570 that applies a torque force that resists retraction of the RHA 300. As another example, guides can include spring components such that guide pegs in the guides are biased to maintain the RHA 300 in the extended orientation as shown in FIG. 3 and FIG. 4; noting that the extended orientation of FIG. 4 may be a fully extended orientation that is achieved at an angle that is less than 360 degrees of the housings 220 and 240.

As an example, one or more spring components can be located proximate to components in a chain of events that aims to generate a linear pull for retraction. As an example, one or more spring components can provide for pushing a RHA outwardly to an extended orientation.

In the examples of FIG. 3 and FIG. 4, the coupling 700 acts to transform displacement along the direction of the x-axis to displacement along the direction of the y-axis. The shape of the coupling 700 can be formed to achieve a desired ratio of displacement, which may be selected in combination with the cam assembly 800, for example, to achieve suitable operation of one or more RHAs of a device.

Figure 5:
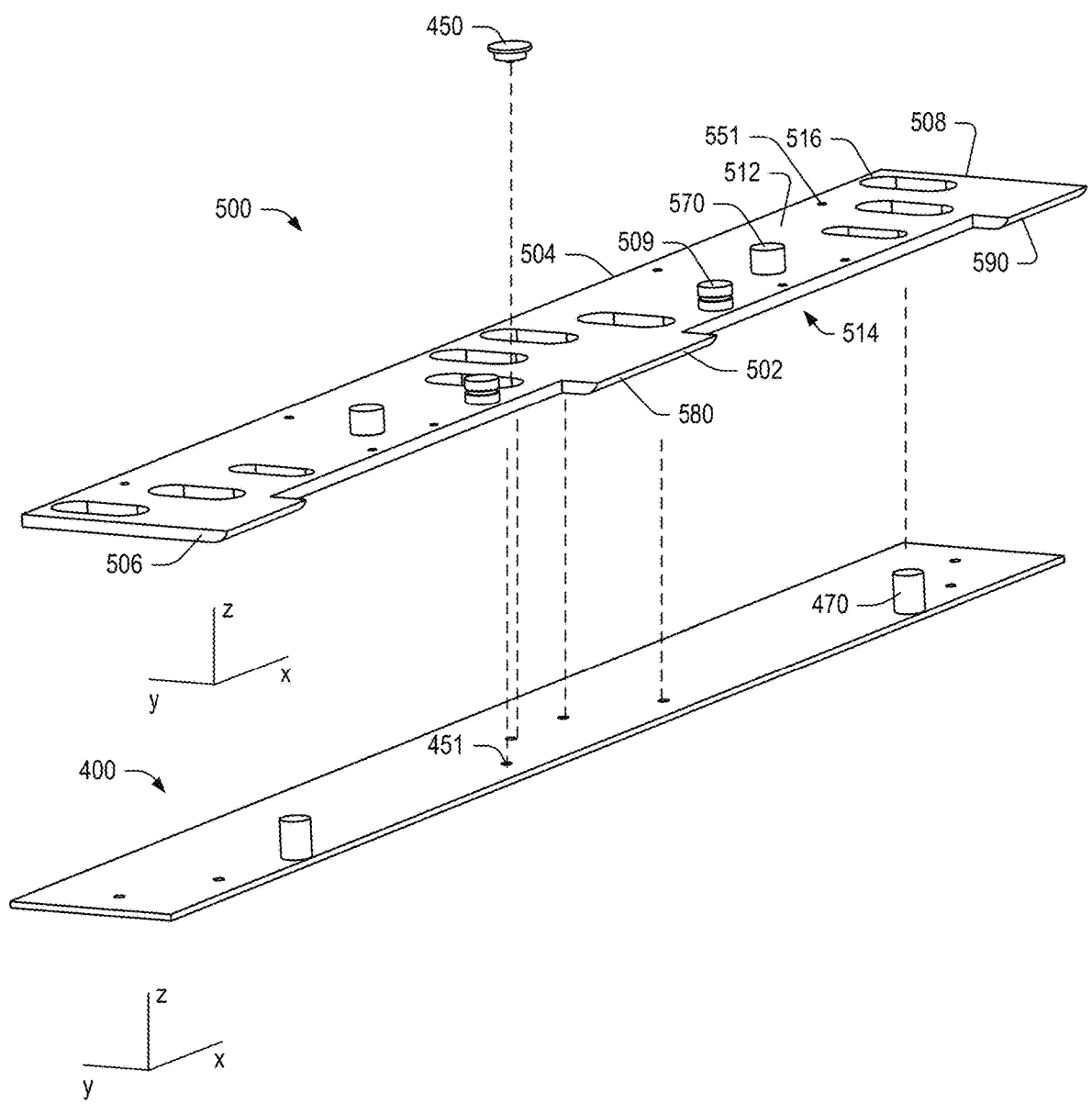
FIG. 5 is a perspective view of an example of an axle support plate.

FIG. 5 shows a perspective view of an example of the base 400 and an example of the axle support plate 500, which includes a front side 502, a back side 504, opposing lateral sides 506 and 508, a top surface 512, a bottom surface 514 various guide openings 516 that can extend between the top surface 512 and the bottom surface 514 and be of a dimension sufficient to allow for movement of the axle support plate 500. Also shown is the peg 570 that can define an axis of rotation of the coupling 700 and a spring component support 509, which may be utilized to couple a spring component such as the spring component 790. In the example of FIG. 5, the axle support plate 500 includes a portion 580 that can support a portion of the cam assembly 800 and includes a portion 590 that can support a portion of the axle assembly 900. In such an example, as the axle support plate 500 translates, various components, assemblies, etc., can translate with the axle support plate 500.

As shown in FIG. 5, the base 400 includes bores 451, which may be threaded to receive guide pegs 450. As shown, the guide peg 450 can pass in part through a guide opening of the axle support plate 500 to be received in part by the bore 451 of the base 400. In such an example, the axle support plate 500 can be translatable in a direction along the y-axis via the guide opening while being properly positioned in the directions along the z-axis and x-axis. FIG. 5 also shows the axle support plate 500 as including bores, which may be threaded to receive guide pegs such as the guide peg 450 (e.g., appropriately sized, etc.). For example, FIG. 3 shows the cam support plate 600 as including guide pegs that are smaller than the guide peg 450. In such an example, the cam support plate 600 can be translatable in a direction along the x-axis via the guide opening while being properly positioned in the directions along the z-axis and y-axis.

As an example, a housing can include base such as the base 400, which can include features to receive guide pegs and/or can include guide pegs that can be received in the guide openings 516. As an example, additionally or alternatively, a housing can directly include one or more guide pegs and may be, optionally, without a base such as the base 400. As an example, the base 400 can be integral to a housing.

Figure 6:
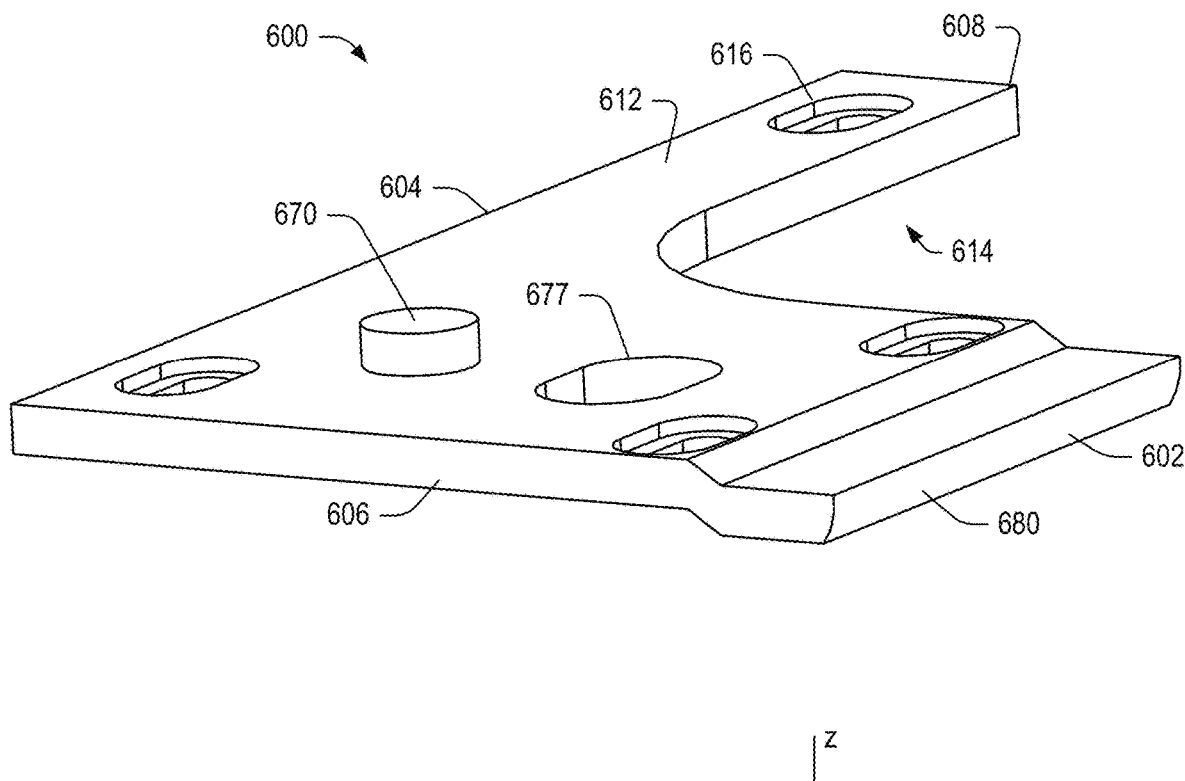
FIG. 6 is a perspective view of an example of a cam support plate.

FIG. 6 shows a perspective view of an example of the cam support plate 600, which includes a front side 602, a back side 604, opposing lateral sides 606 and 608, a top surface 612, a bottom surface 614 various guide openings 616 that can extend between the top surface 612 and the bottom surface 614 and be of a dimension sufficient to allow for movement of the cam support plate 600. Also shown is the peg 670 that can cooperate with an opening of the coupling 700. Additionally, the cam support plate 600 is shown as including an opening 677 that can receive the peg 570 of the axle support plate 500. As an example, the peg 570 can be a bore, a bushing, a boss, etc., which may be integral to the axle support plate 500 or a separate component that can be coupled to the axle support plate 500. As an example, the coupling 700 can include a peg that extends to a fitting of the axle support plate 500 through the opening 677 of the cam support plate 600 to provide for rotational motion of the coupling 700 responsive to cam action. In the example of FIG. 6, the cam support plate 600 also includes a cam component mount 680, which may be utilized to mount a rotatable cam component (e.g., to drive the cam support plate 600 in a direction along the x-axis).

Figure 7:
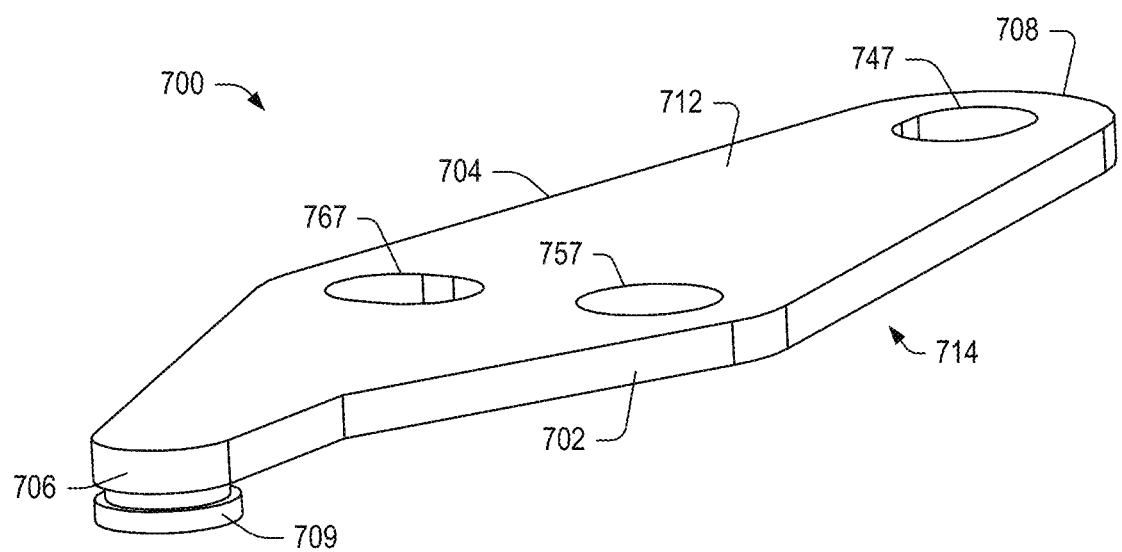
FIG. 7 is a perspective view of an example of a coupling.
Figure 7:
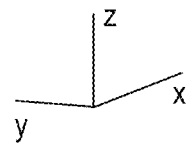

FIG. 7 shows a perspective view of an example of the coupling 700, which includes a front side 702, a back side 704, opposing lateral sides 706 and 708, a top surface 712, a bottom surface 714, a spring component support 709, and various openings 747, 757 and 767 that can extend between the top surface 712 and the bottom surface 714.

As shown in the examples of FIG. 3 and FIG. 4, the opening 747 can receive a peg that can be a fixed peg such as that of the base 400 or the housing 220. As to the opening 757, it can receive a component that is coupled to the axle support plate 500 such that the coupling 700 can rotate about an axis that may be defined by the opening 757 (e.g., a central axis of the opening 757). As to the opening 767, it can receive the peg 670 of the cam support plate 600.

In the example of FIG. 7, the coupling 700 is shaped as a plate with various features such that the coupling 700 can be biased and rotate to cause transformation of a distance in a first direction to a distance in a second direction where the first distance may be smaller than the second distance. As explained, the cam support plate 600 can move responsive to cam action of the cam assembly 800 where the coupling 700 can be configured to cause the axle support plate 500 (e.g., and components carried thereby) to move a distance.

Figure 8:
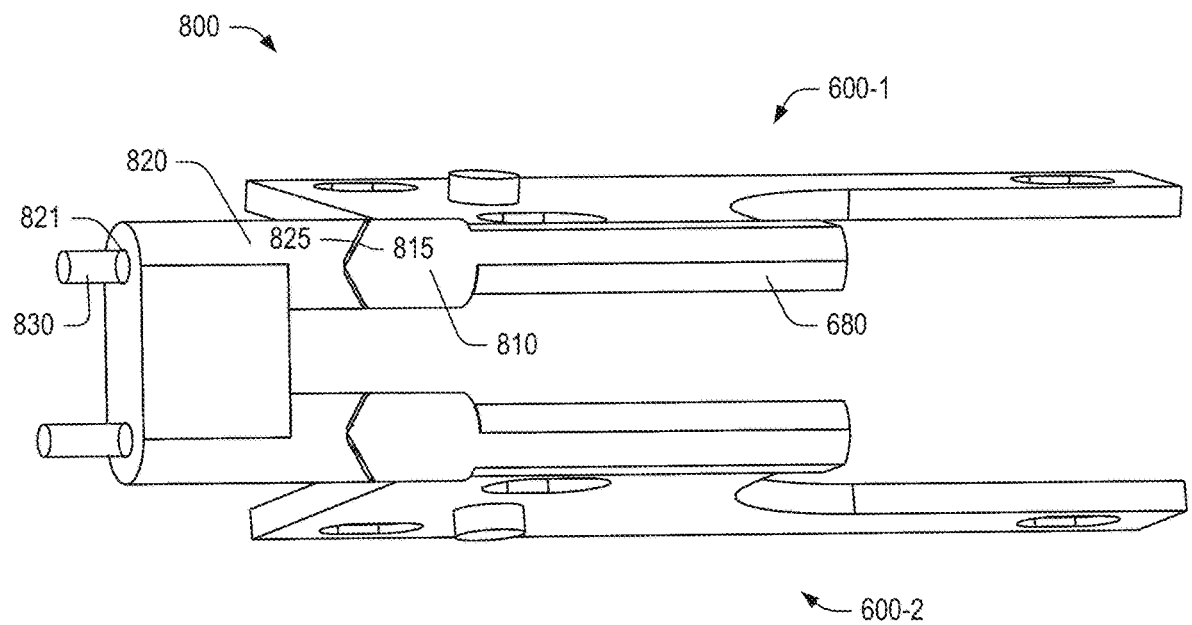
FIG. 8 is a perspective view of an example of a cam assembly and examples of components.
Figure 8:
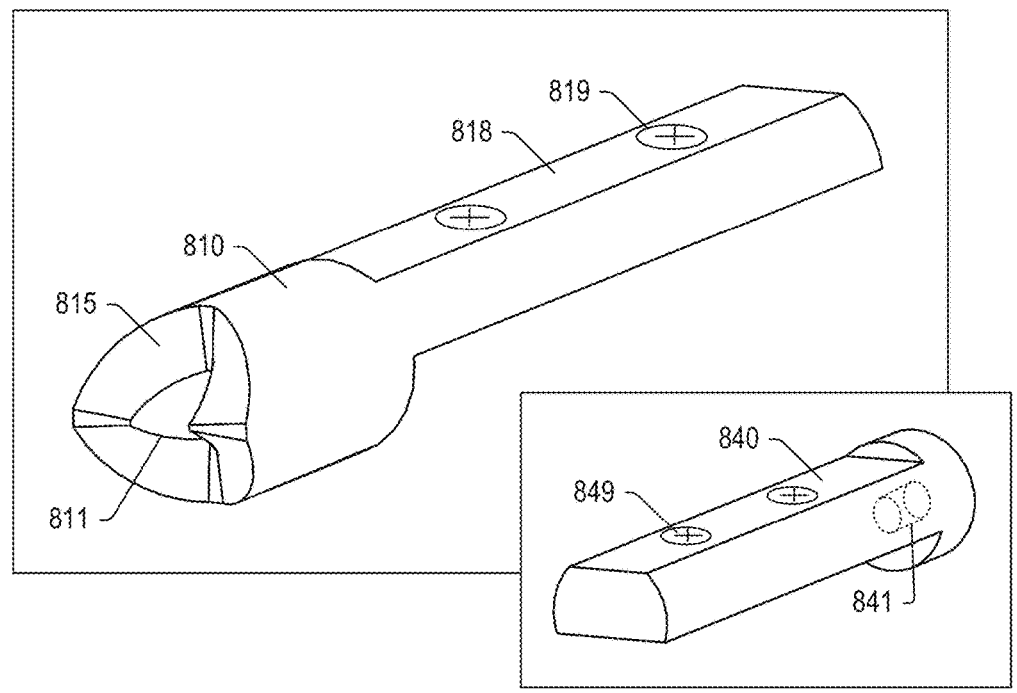

FIG. 8 shows an example of the cam assembly 800 with respect to a cam support plate 600-1 where the cam assembly 800 is operatively coupled to another cam support plate 600-2.

As shown, the cam assembly 800 includes a first cam component 810 with a cam surface 815 and a second cam component 820 with a cam surface 825. As shown in the example of FIG. 8, the first cam component 810 can be fixed to the cam support plate 600-1 at the cam component mount 680. For example, the cam component 810 can be mounted to the cam support plate 600-1 via welding, screws, bolts, etc. In the example of FIG. 8, one or more bolts 819 are shown, which may be threaded into threaded bores of the cam support plate 600-1, for example, at the cam component mount 680.

As mentioned, a gear assembly can include a component that may be a cover, a housing, etc., that bridges two axles. In the example of FIG. 8, the second cam component 820 can be a bridge component and may be dimensioned with one or more dimensions of a bridge component of a gear assembly. For example, the second cam component 820 and another bridge component can include axes that align such that spacing between axes is approximately the same at the cam assembly 800 and at the axle assembly 900.

As shown in the example of FIG. 8, the second cam component 820 can include the cam surface 825 that is arranged to face the cam surface 815 where the cam surfaces 815 and 825 are rotatable with respect to each other to cause axial motion. For example, the cam component 810 can include a bore 811 and the cam component 820 can include a bore 821 where a shaft 830 (e.g., an axle, etc.) is positioned at least in part in the bore 811 and the bore 821. Such a shaft may be fixed or rotatable. As shown, the shaft 830 provides for axial alignment of the cam components 810 and 820. As shown, the shaft 830 includes an end that extends a distance outwardly from the cam component 820. In such an example, a fixture 840 may receive the portion of the shaft 830 where the fixture 840 is fixed to the portion 580 of the axle support plate 500 where the portion 580 can support a portion of the cam assembly 800. For example, a portion of the cam assembly 800 can be supported by the cam support plate 600 and a portion of the cam assembly 800 can be supported by the axle support plate 500 via a fixture such as the fixture 840. In such an example, the axial motion generated via cam surface to cam surface rotation can cause the cam support plate 600 to move axially relative to the axle support plate 500, where, as explained, via the coupling 700, both the axle support plate 500, the cam support plate, the cam assembly 800 and the axle assembly 900 can move into or out of a recess of a housing.

Referring again to FIG. 4, the second cam component 820 is shown with a fixture such as the fixture 840 that can be fixed to the axle support plate 500 via the portion 580. In the example of FIG. 8, the fixture 840 is shown as including a bore 841 that can receive a portion of the shaft 830 and one or more bolts 849. The fixture 840 may be mounted to the axle support plate 500 via welding, screws, bolts, etc. In the example of FIG. 8, one or more bolts 849 are shown, which may be threaded into threaded bores of the axle support plate 500, for example, at the portion 580.

As mentioned, cam surfaces may be shaped to provide desirable behavior, which may be characterized via a plot of axial throw versus angle (e.g., offset angle, etc.). In the example of FIG. 8, the cam component 820 can include another cam surface as part of an assembly that includes the cam support plate 600-2.

Figure 9:
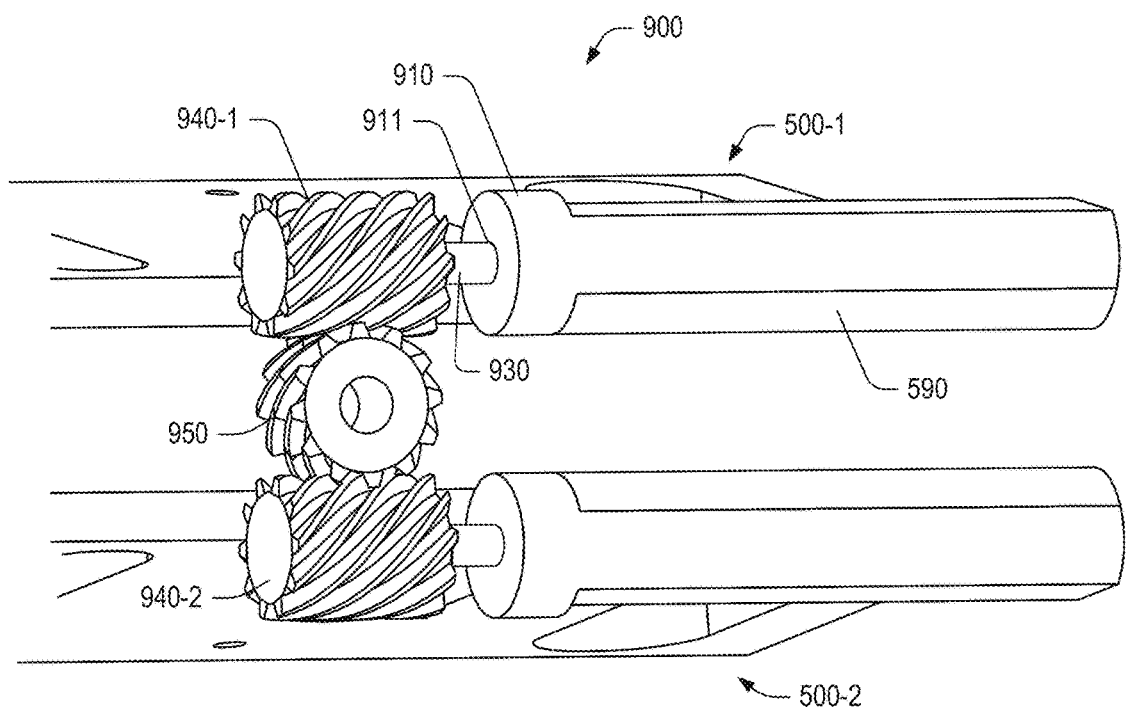
FIG. 9 is a series of perspective views of examples of an axle assembly and examples of components.
Figure 9:
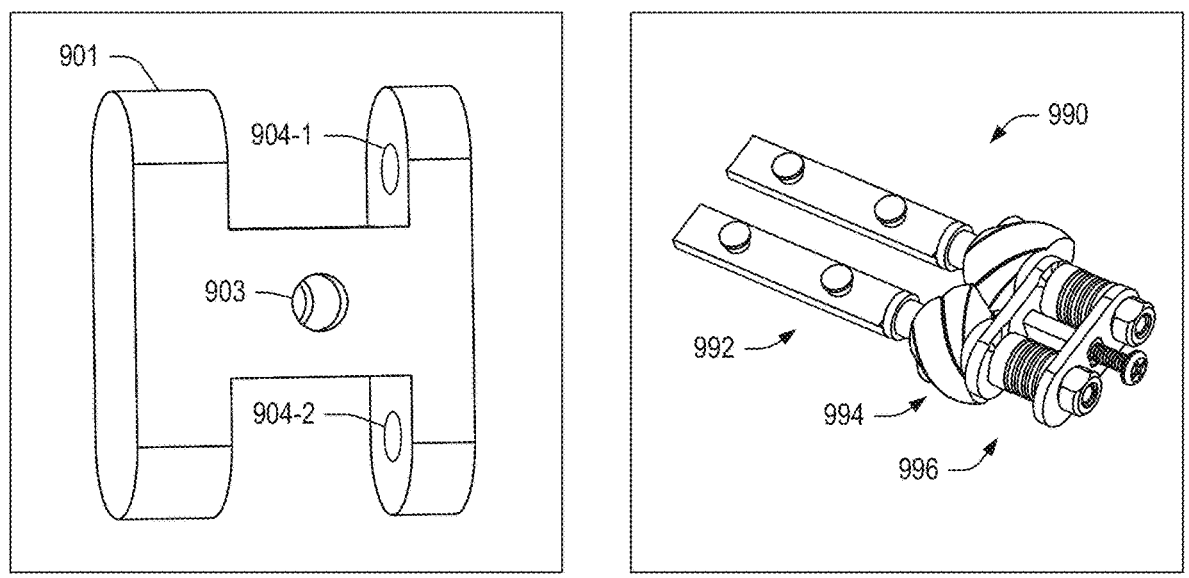

FIG. 9 shows an example of the axle assembly 900 with respect to an axle support plate 500-1 where the axle assembly 900 is operatively coupled to another axle support plate 500-2.

In the example of FIG. 9, the axle assembly 900 includes a fixture 910 that is fixed to the portion 590 of the axle support plate 500-1 where the fixture 910 supports an axle 930 that may be supported in a bore 911 of the fixture 910. As an example, the fixture 910 may be mounted to the axle support plate 500 via welding, screws, bolts, etc. (see, e.g., bolts 819, 849, etc.). As shown, the axle assembly 900 includes gears 940-1, 950 and 940-2 where the gears 940-1 and 940-2 can be helical gears and the gear can be an idler gear 950.

FIG. 9 also shows an example of a cover 901 (see, e.g., FIG. 4), which can be a gear box or gear housing. As mentioned, an axle assembly can include a bridge component. For example, the cover 901 can be a bridge component. As shown in the example of FIG. 9, the cover 901 includes an opening that may receive an axle for the gear 950 to support the gear 950 to mesh with the gears 940-1 and 940-2. The cover 901 is also shown as including openings 904-1 and 904-2, which can receive the axle 930 and another such axle, which can support the gears 940-1 and 940-2, respectively. In the example of FIG. 9, the gears 940-1, 940-2, and 950 rotate in unison. As an example, the gears may differ in size. For example for a thinner housing, one or more of the gears 940-1 and 940-2 may be of a smaller diameter.

FIG. 9 also shows an axle assembly 990 that may be utilized, additionally or alternatively, to the axle assembly 900. In the example axle assembly 990, two lobe gears 994 mesh without an idler gear where the gears 994 may be supported on axle components 992 that can be fixed to an axle support plate (e.g., the axle support plate 500, etc.). As shown in the example of FIG. 9, the axle assembly 990 can include a tensioner, which can be a friction assembly that provides a level of friction such that housings may be oriented to a desired orientation without sliding undesirably out of the orientation. Such friction can be at a level that allows for manual orienting housings coupled via one or more RHAs.

Figure 10:
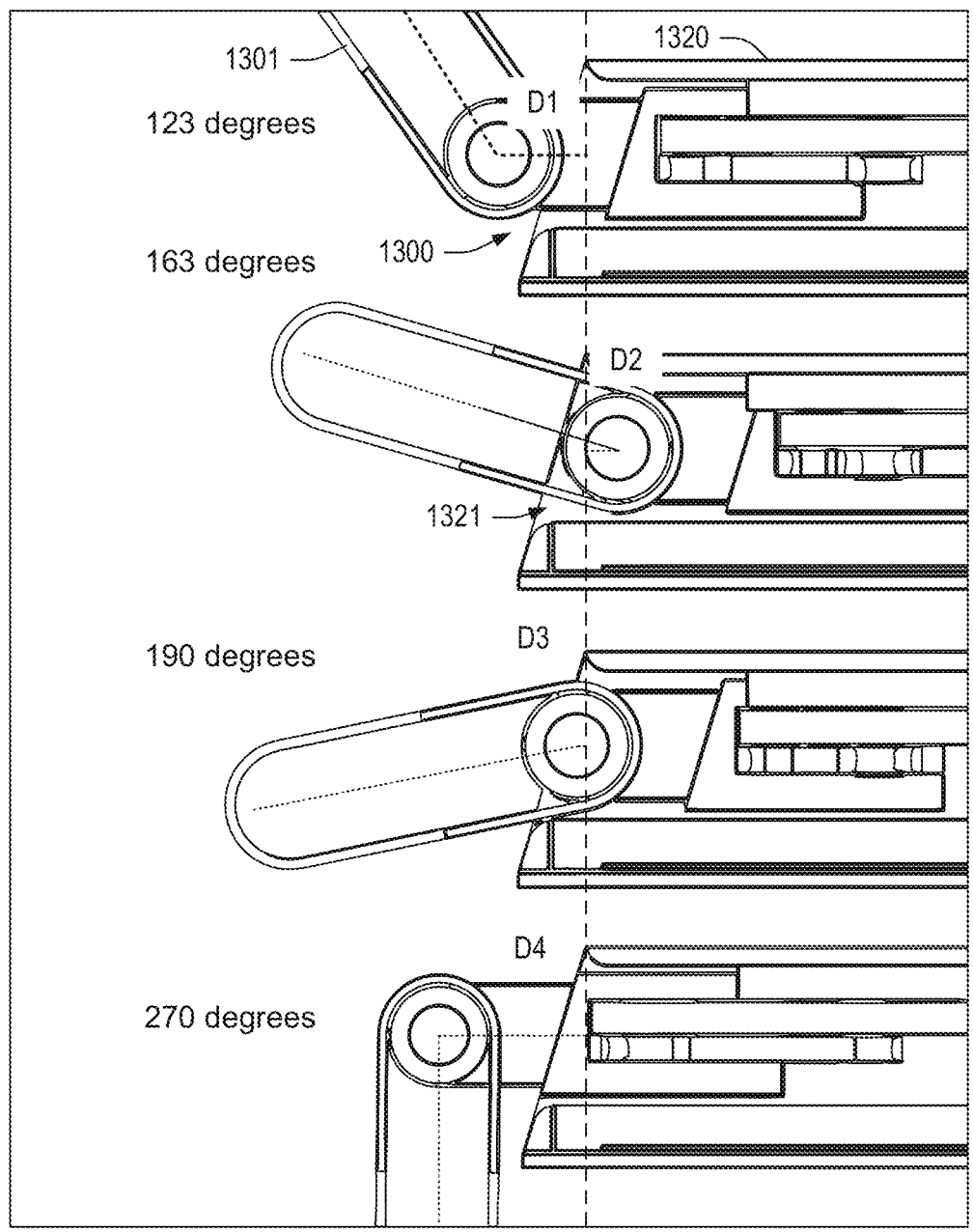
FIG. 10 is a series of cross-sectional views of an example of a device in various orientations.

FIG. 10 shows examples of orientations of a housing 1320 with respect to a RHA 1300 that includes a bridge component 1301 where the RHA 1300 can operate to retract a portion thereof into a recess 1321 of the housing 1320. As shown, a portion of the bridge component 1301 can also be retracted into the recess 1321; whereas, in a fully extended state, the bridge component 1301 is not within the recess 1321.

As shown, the housing 1320 includes a slanted back edge or slanted back side where a recess of the housing 1320 includes a shorter distance at the top and a longer distance at the bottom. As shown in the four example orientations, the behavior of the RHA 1300 can be constructed to accommodate the shape of the housing 1320. As shown, each of the angles 123 degrees, 163 degrees, 190 degrees and 270 degrees has a corresponding distance D1, D2, D3 and D4, respectively, taken with reference to a top of the housing 1320. As an example, the orientation at 123 degrees may be a notebook type of orientation while the orientation at 270 degrees may be a tent type of orientation.

The orientations 163 degrees and 190 degrees bound the 180 degree orientation (e.g., one lesser and one greater) where, at the 180 degree orientation, the RHA 1300 can be fully retracted into the housing 1320. As shown, 163 degrees is 17 degrees less than 180 degrees while 190 degrees is 10 degrees more than 180 degrees. However, at 163 degrees, the distance D2 is to the right of the reference line (dashed line) while at 190 degrees, the distance D3 is to the left of the reference line. Thus, 10 degrees more than 180 degrees results in the RHA 1300 being more extended out of the housing than 17 degrees less than 180 degrees. If the behavior of the RHA was symmetric about 180 degrees, at 190 degrees, the RHA 1300 would not be as extended as shown in FIG. 10. As shown in the example of FIG. 10, from 180 degrees to 270 degrees, there can be a larger ratio of extension outward with respect to rotation, which may aim to account for the lower surface of the housing 1320 sticking further back than the upper surface of the housing 1320.

Figure 11:
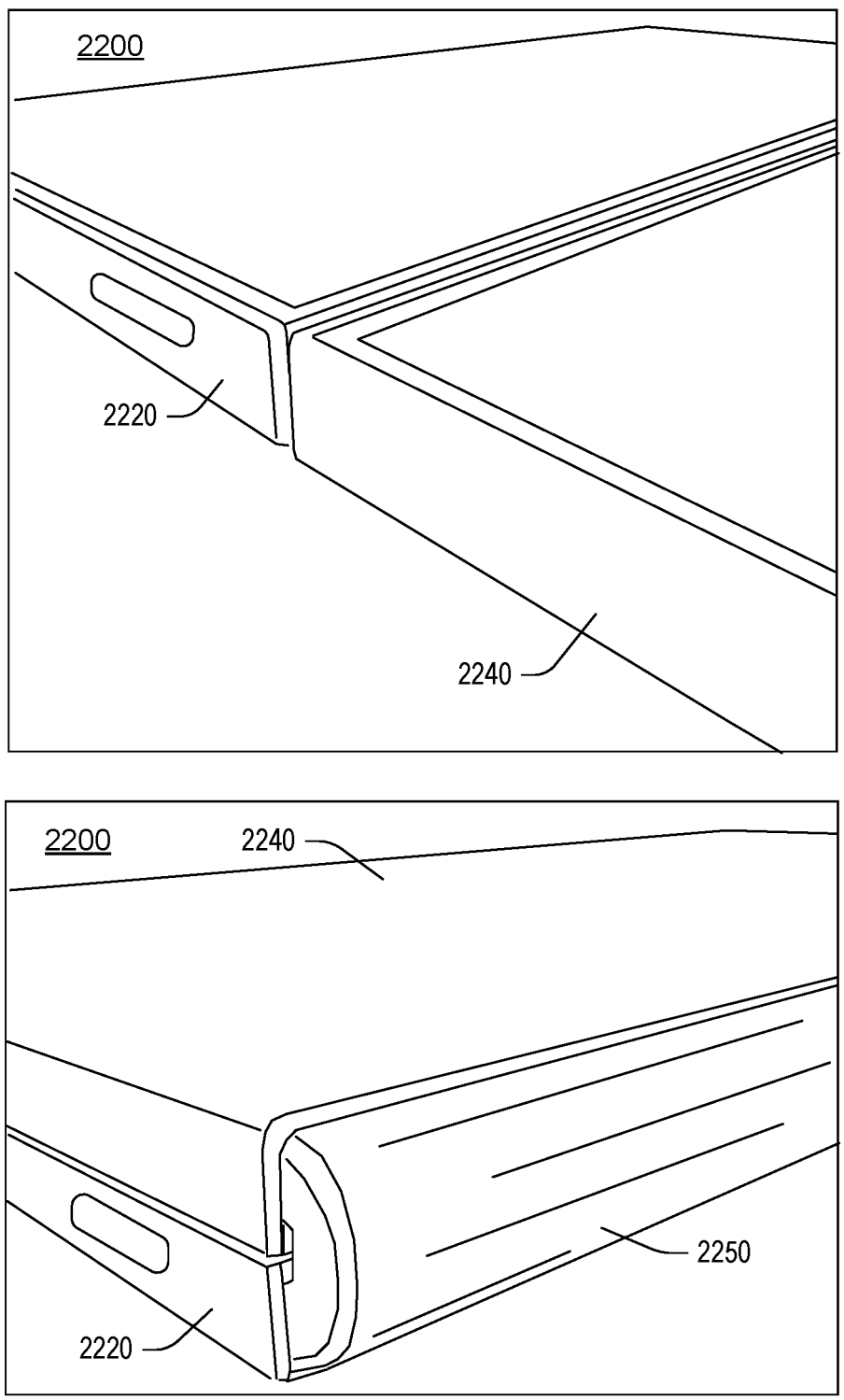
FIG. 11 is a view of an example of a device with multiple displays in a planar orientation and an image rendered to the multiple displays and a view of the device in a closed orientation.

FIG. 11 shows an example of a device 2200 with housings 2220 and 2240 operatively coupled via one or more retractable hinge assemblies such that a gap between the housings 2220 and 2240 is minimal in the planar orientation. As shown in FIG. 11, the device 2200 can include a cover 2250 that can be retractable with a retractable hinge assembly. As an example, the cover 2250 may be made of a polymer, a metal, an alloy, etc. As an example, the cover 2250 may be made of an elastomer. As an example, the cover 2250 may be made of silicone. In the closed orientation shown in FIG. 11, the cover 2250 can be sufficiently sticky for friction with a human hand, which may be a bare hand or a hand in a glove. As an example, the cover 2250 may provide for shock absorbing where the device 2200 is dropped or slides into an object. As an example, the cover 2250 can be transparent or translucent where lights, components, etc., may be discernable through the cover 2250. As an example, where the components of a retractable hinge assembly are colored and finished, they may be aesthetic like the mechanism of a mechanical watch such that a transparent cover can display the components, which can move responsive to rotation of the housing 2220 and 2240. In the example of FIG. 11, the planar orientation includes a single image that is rendered across displays of the multi-display device. As shown, the gap can be minimal and provide for a relatively continuous display surface, which may be suitable for making gestures, etc.

As an example, a device can include a first housing that includes a first display and a first recess; a second housing that includes a second display and a second recess; and a retractable hinge assembly where, in a planar orientation of the first housing and the second housing, the retractable hinge assembly is retracted in part in the first recess and in part in the second recess. In such an example, in a closed clamshell orientation of the first housing and the second housing, the retractable hinge assembly can be extended in part from the first housing and extended in part from the second housing. As an example, a retractable hinge assembly can retract responsive to rotation of a first housing with respect to a second housing.

As an example, a device can be a computing device with one or more processors and memory accessible to at least one of the processors where displays of the device may be operable effectively as a single display (e.g., a continuous display) when display housings of the device are in a planar orientation.

As an example, a retractable hinge assembly can include a spring component that biases the retractable hinge assembly toward an extended state where force of the spring component is greater in a retracted state of the planar orientation.

As an example, a retractable hinge assembly can include a cam assembly and an axle assembly, where the cam assembly converts rotational motion into translational motion. For example, consider translational motion that is along a first direction where the RHA includes a coupling that transfers the translational motion along a second, different direction. In such an example, the first direction can be along a rotational axis of an axle assembly and the second direction can be orthogonal to the first direction.

As an example, a retractable hinge assembly can include an axle support plate, a cam support plate, an axle assembly and a cam assembly. In such an example, the cam support plate can be translatable in a first direction where the axle support plate translates the cam support plate in a second, different direction responsive to translation of the cam support plate in the first direction.

As an example, a retractable hinge assembly can include an annular cam surface that is disposed about a shaft, where the shaft aligns the annular cam surface with another cam surface (e.g., another annular cam surface, etc.). In such an example, rotation of the annular cam surface can convert rotational motion to translational motion.

As an example, a retractable hinge assembly can include at least four cam surfaces. As an example, a retractable hinge assembly can include at least eight cam surfaces. For example, consider four on a right hand side of a display device and four on a left hand side of the display device. In such an example, forces associated with retraction of a RHA can be distributed, which may provide for greater operational life, smoother operation, etc.

As an example, a retractable hinge assembly can include helical gears that mesh with an idler gear. As an example, a RHA can include two gears that mesh directly or that mesh via another gear or gears.

As an example, a retractable hinge assembly can include an axle support plate that includes guides that limit motion of the axle support plate along a first direction. In such an example, the retractable hinge assembly can include a cam support plate that includes guides that limit motion of the axle support plate along a second, different direction. In such an example, the first direction and the second direction can be orthogonal.

As an example, a device can include a cover that, in a planar orientation of housings of the device, is retracted and that extends with a retractable hinge assembly upon transitioning to a different orientation.

As an example, a retractable hinge assembly can include a retracted state that corresponds to a planar orientation of two housings coupled thereby being defined by an angle of 180 degrees, where at an angle of 170 degrees the retractable hinge assembly has a first partially retracted state characterized by a first distance and where at an angle of 190 degrees the retractable hinge assembly has a second partially retracted state characterized by a second distance. In such an example, the first distance and the second distance can differ. As an example, such behavior may be tailored via one or more mechanisms. For example, consider cam surfaces being shaped to achieve desired behavior (see, e.g., FIG. 10) and/or a coupling being shaped to achieve desired behavior (see, e.g., FIG. 7). As mentioned, an overall ratio may be provided where, for example, the ratio differs with respect to angle of rotation. For example, a final ratio may be 2:1 between a planar orientation and a closed orientation (e.g., or tablet orientation) while the ratio may differ from 2:1 during transition. As an example, a final ratio may differ for a closed, clamshell orientation than for a tablet orientation, which may be referred to as asymmetric ratios (e.g., where symmetric ratios would be the same).

As shown in FIG. 10, a housing can include a slanted end where behavior of a RHA may account for the shape of the slanted end of the housing (e.g., an optionally another housing, etc.). As an example, a RHA may be characterized by symmetric behavior about a planar, 180 degree orientation or by asymmetric behavior about a planar, 180 degree orientation. In the asymmetric configuration, a plot of orientation angle versus throw from 180 degrees to 0 degrees can differ from orientation angle versus throw from 180 degrees to 360 degrees. As explained, an asymmetric configuration may be utilized in a manner that depends on end shape of a housing or end shapes of housings. For example, where end shapes are "square" and symmetric, a symmetric configuration may be utilized; whereas, for a slanted end shape, as an example, an asymmetric configuration may be utilized.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
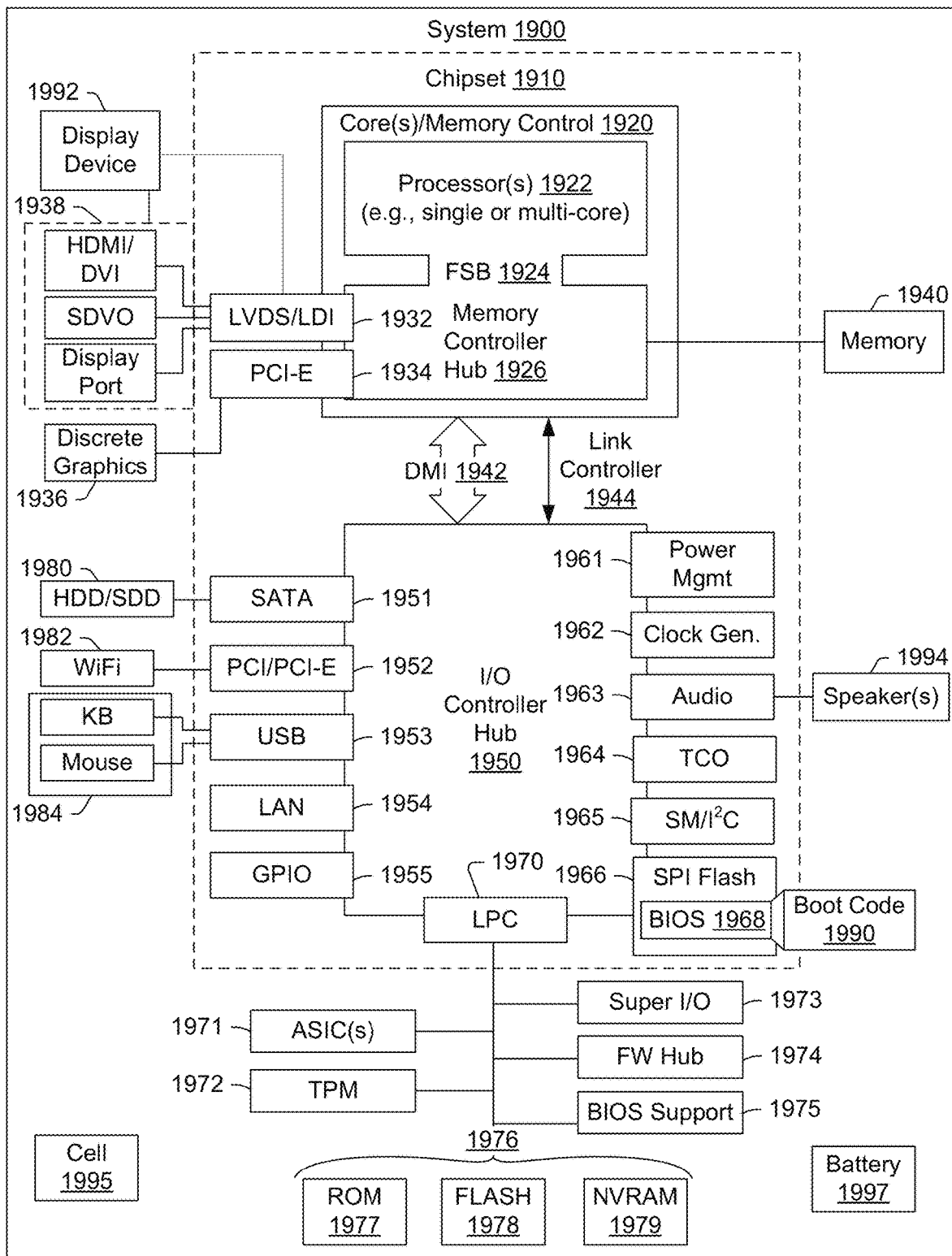
FIG. 12 is a diagram of an example of a system.

While various examples of circuits or circuitry have been discussed, FIG. 12 depicts a block diagram of an illustrative computer system 1900. The system 1900 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a display device or other machine may include other features or only some of the features of the system 1900.

As shown in FIG. 12, the system 1900 includes a so-called chipset 1910. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1910 has a particular architecture, which may vary to some extent depending on brand or manufacturer. The architecture of the chipset 1910 includes a core and memory control group 1920 and an I/O controller hub 1950 that exchange information (e.g., data, signals, commands, etc.) via, for example, a direct management interface or direct media interface (DMI) 1942 or a link controller 1944. In the example of FIG. 12, the DMI 1942 is a chip-to-chip interface (sometimes referred to as being a link between a "northbridge" and a "southbridge").

The core and memory control group 1920 include one or more processors 1922 (e.g., single core or multi-core) and a memory controller hub 1926 that exchange information via a front side bus (FSB) 1924. As described herein, various components of the core and memory control group 1920 may be integrated onto a single processor die, for example, to make a chip that supplants the conventional "northbridge" style architecture.

The memory controller hub 1926 interfaces with memory 1940. For example, the memory controller hub 1926 may provide support for DDR SDRAM memory (e.g., DDR, DDR2, DDR3, etc.). In general, the memory 1940 is a type of random-access memory (RAM). It is often referred to as "system memory".

The memory controller hub 1926 further includes a low-voltage differential signaling interface (LVDS) 1932. The LVDS 1932 may be a so-called LVDS Display Interface (LDI) for support of a display device 1992 (e.g., a CRT, a flat panel, a projector, etc.). A block 1938 includes some examples of technologies that may be supported via the LVDS interface 1932 (e.g., serial digital video, HDMI/DVI, display port). The memory controller hub 1926 also includes one or more PCI-express interfaces (PCI-E) 1934, for example, for support of discrete graphics 1936. Discrete graphics using a PCI-E interface has become an alternative approach to an accelerated graphics port (AGP). For example, the memory controller hub 1926 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1950 includes a variety of interfaces. The example of FIG. 12 includes a SATA interface 1951, one or more PCI-E interfaces 1952 (optionally one or more legacy PCI interfaces), one or more USB interfaces 1953, a LAN interface 1954 (more generally a network interface), a general purpose I/O interface (GPIO) 1955, a low-pin count (LPC) interface 1970, a power management interface 1961, a clock generator interface 1962, an audio interface 1963 (e.g., for speakers 1994), a total cost of operation (TCO) interface 1964, a system management bus interface (e.g., a multi-master serial computer bus interface) 1965, and a serial peripheral flash memory/controller interface (SPI Flash) 1966, which, in the example of FIG. 12, includes BIOS 1968 and boot code 1990. With respect to network connections, the I/O hub controller 1950 may include integrated gigabit Ethernet controller lines multiplexed with a PCI-E interface port. Other network features may operate independent of a PCI-E interface.

The interfaces of the I/O hub controller 1950 provide for communication with various devices, networks, etc. For example, the SATA interface 1951 provides for reading, writing or reading and writing information on one or more drives 1980 such as HDDs, SDDs or a combination thereof. The I/O hub controller 1950 may also include an advanced host controller interface (AHCI) to support one or more drives 1980. The PCI-E interface 1952 allows for wireless connections 1982 to devices, networks, etc. The USB interface 1953 provides for input devices 1984 such as keyboards (KB), one or more optical sensors, mice and various other devices (e.g., microphones, cameras, phones, storage, media players, etc.). On or more other types of sensors may optionally rely on the USB interface 1953 or another interface (e.g., I²C, etc.). As to microphones, the system 1900 of FIG. 12 may include hardware (e.g., audio card) appropriately configured for receipt of sound (e.g., user voice, ambient sound, etc.).

In the example of FIG. 12, the LPC interface 1970 provides for use of one or more ASICs 1971, a trusted platform module (TPM) 1972, a super I/O 1973, a firmware hub 1974, BIOS support 1975 as well as various types of memory 1976 such as ROM 1977, Flash 1978, and non-volatile RAM (NVRAM) 1979. With respect to the TPM 1972, this module may be in the form of a chip that can be used to authenticate software and hardware devices. For example, a TPM may be capable of performing platform authentication and may be used to verify that a system seeking access is the expected system.

The system 1900, upon power on, may be configured to execute boot code 1990 for the BIOS 1968, as stored within the SPI Flash 1966, and thereafter processes data under the control of one or more operating systems and application software (e.g., stored in system memory 1940). An operating system may be stored in any of a variety of locations and accessed, for example, according to instructions of the BIOS 1968. Again, as described herein, a satellite, a base, a server or other machine may include fewer or more features than shown in the system 1900 of FIG. 12. Further, the system 1900 of FIG. 12 is shown as optionally include cell phone circuitry 1995, which may include GSM, CDMA, etc., types of circuitry configured for coordinated operation with one or more of the other features of the system 1900.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a first housing that comprises a first display and a first recess;
   a second housing that comprises a second display and a second recess; and
   a retractable hinge assembly that comprises a cam assembly and an axle assembly, wherein the cam assembly converts rotational motion into translational motion, wherein, in a planar orientation of the first housing and the second housing, the retractable hinge assembly is retracted in part in the first recess and in part in the second recess.

2. The device of claim 1, wherein in a closed clamshell orientation of the first housing and the second housing, the retractable hinge assembly is extended in part from the first housing and extended in part from the second housing.

3. The device of claim 1, wherein the retractable hinge assembly retracts responsive to rotation of the first housing with respect to the second housing.

4. The device of claim 1, wherein the retractable hinge assembly comprises a spring component that biases the retractable hinge assembly toward an extended state and wherein force of the spring component is greater in a retracted state of the planar orientation.

5. The device of claim 1, wherein the translational motion is along a first direction and comprising a coupling that transfers the translational motion along a second, different direction.

6. The device of claim 5, wherein the first direction is along a rotational axis of the axle assembly and wherein the second direction is orthogonal to the first direction.

7. The device of claim 1, wherein the retractable hinge assembly comprises an axle support plate and a cam support plate.

8. The device of claim 7, wherein the cam support plate is translatable in a first direction and wherein the axle support plate translates the cam support plate in a second, different direction responsive to translation of the cam support plate in the first direction.

9. The device of claim 1, wherein the retractable hinge assembly comprises an annular cam surface that is disposed about a shaft, wherein the shaft aligns the annular cam surface with another cam surface.

10. The device of claim 9, wherein rotation of the annular cam surface converts rotational motion to translational motion.

11. The device of claim 1, wherein the retractable hinge assembly comprises at least four cam surfaces.

12. The device of claim 11, wherein the retractable hinge assembly comprises at least eight cam surfaces.

13. The device of claim 1, wherein the retractable hinge assembly comprises helical gears that mesh with an idler gear.

14. The device of claim 1, wherein the retractable hinge assembly comprises an axle support plate that comprises guides that limit motion of the axle support plate along a first direction.

15. The device of claim 14, wherein the retractable hinge assembly comprises a cam support plate that comprises guides that limit motion of the axle support plate along a second, different direction.

16. The device of claim 15, wherein the first direction and the second direction are orthogonal.

17. The device of claim 1, comprising a cover that, in the planar orientation, is retracted and that extends with the retractable hinge assembly upon transitioning to a different orientation.

18. The device of claim 1, wherein the retractable hinge assembly comprises a retracted state that corresponds to the planar orientation being defined by an angle of 180 degrees, wherein at an angle of 170 degrees the retractable hinge assembly comprises a first partially retracted state characterized by a first distance and wherein at an angle of 190 degrees the retractable hinge assembly comprises a second partially retracted state characterized by a second distance.

19. The device of claim 18, wherein the first distance and the second distance differ.

20. A device comprising:
a first housing that comprises a first display and a first recess;
a second housing that comprises a second display and a second recess; and
a retractable hinge assembly that comprises an axle support plate, a cam support plate, an axle assembly and a cam assembly, wherein, in a planar orientation of the first housing and the second housing, the retractable hinge assembly is retracted in part in the first recess and in part in the second recess.

21. The device of claim 20, wherein the cam support plate is translatable in a first direction and wherein the axle support plate translates the cam support plate in a second, different direction responsive to translation of the cam support plate in the first direction.

22. A device comprising:
a first housing that comprises a first display and a first recess;
a second housing that comprises a second display and a second recess; and
a retractable hinge assembly that comprises at least four cam surfaces, wherein, in a planar orientation of the first housing and the second housing, the retractable hinge assembly is retracted in part in the first recess and in part in the second recess.

23. The device of claim 22, wherein the retractable hinge assembly comprises at least eight cam surfaces.

* * * * *